Feb. 10, 1925.

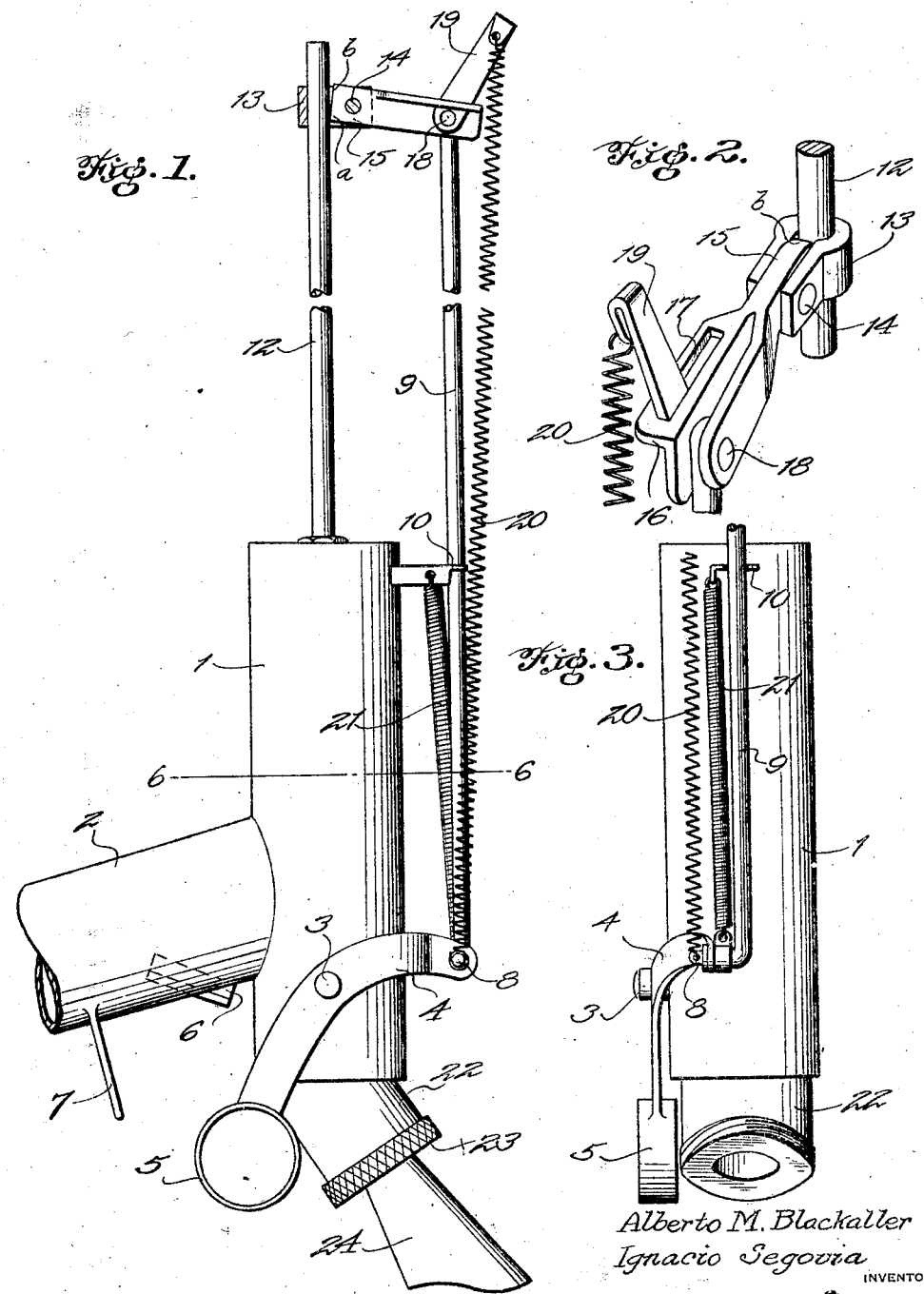

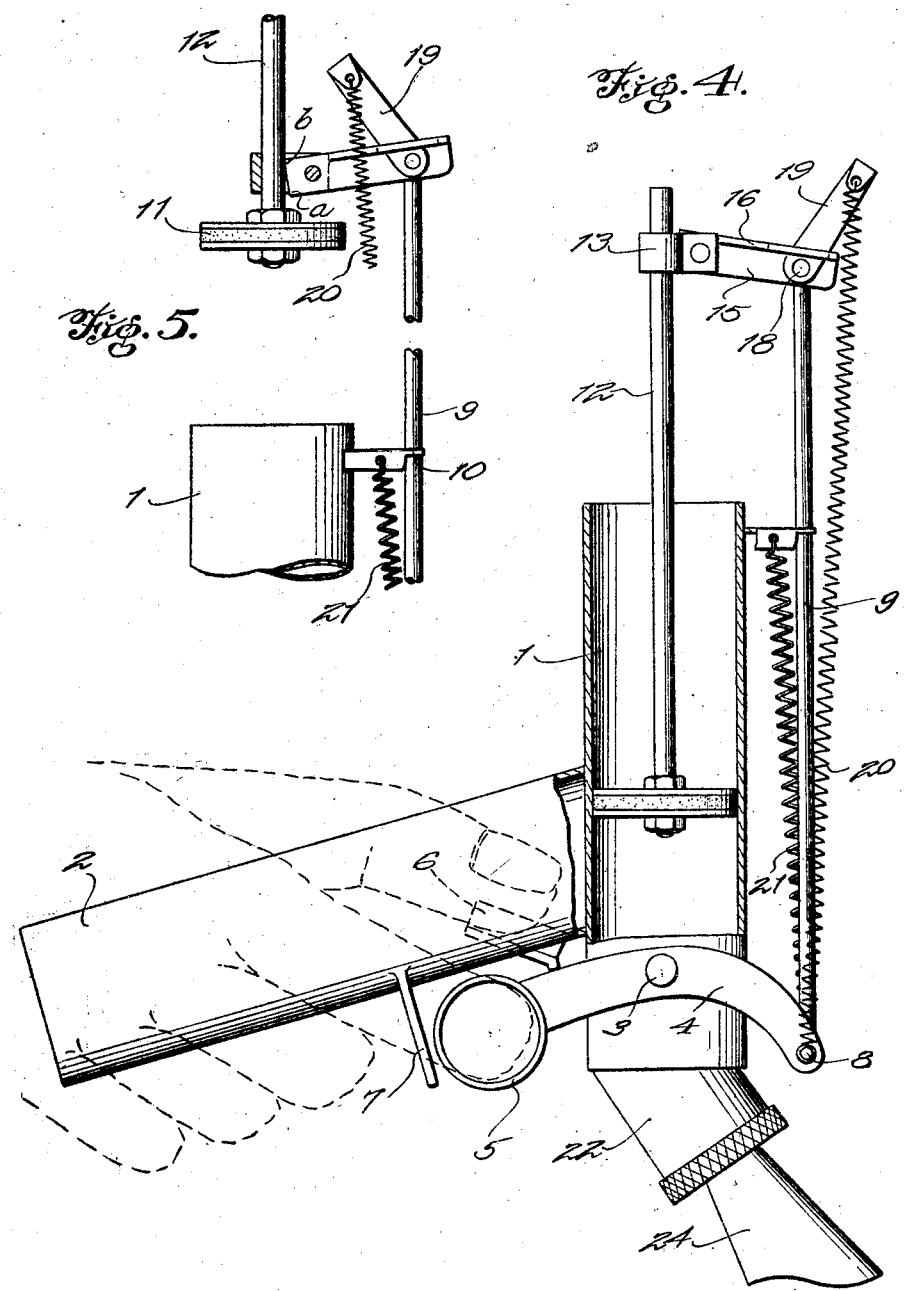

A. M. BLACKALLER ET AL

MACHINE FOR MAKING FLOWER DESIGNS OF SUGAR

Filed Aug. 20, 1924

Alberto M. Blackaller
Ignacio Segovia
INVENTORS

Feb. 10, 1925.
A. M. BLACKALLER ET AL
MACHINE FOR MAKING FLOWER DESIGNS OF SUGAR
Filed Aug. 20, 1924

Alberto M. Blackaller
Ignacio Segovia
INVENTORS

BY Victor J. Evans
ATTORNEY

R. E. Wise.
WITNESS:

Patented Feb. 10, 1925.

1,526,112

UNITED STATES PATENT OFFICE.

ALBERTO MIGUEL BLACKALLER AND IGNACIO SEGOVIA, OF SAN ANTONIO, TEXAS.

MACHINE FOR MAKING FLOWER DESIGNS OF SUGAR.

Application filed August 20, 1924. Serial No. 733,192.

*To all whom it may concern:*

Be it known that we, ALBERTO MIGUEL BLACKALLER and IGNACIO SEGOVIA, citizens of Mexico, residing at San Antonio, in the county of Bexar and State of Texas, have invented new and useful Improvements in Machines for Making Flower Designs of Sugar, of which the following is a specification.

Our present invention has reference to an apparatus for molding sugar paste into shapes for forming the various parts of flowers or other ornamental articles.

Our object is to produce hand operated apparatus all of the same general design but each provided with a separate nozzle for producing the pistil, stamens, corolla and calyx of a flower or parts of any other ornamental sugar design, which shall be characteristic of simplicity in construction, coupled with ease and accuracy in operation.

It is a further object to produce, in a device for this purpose, a barrel within which sugar paste is received and a plunger movable by trigger operated means to act upon the paste to force the same through a shaping nozzle associated with the barrel, said means being also susceptible to moving the plunger in an outward direction with respect to the barrel for the refilling of said barrel, by the same swinging movement of the trigger.

With the above broadly stated objects in view, and others which will appear as the nature of the invention is better understood, reference is to be had to the drawings which accompany and which form part of this application.

In the drawings:—

Figure 1 is a side elevation of the improvement.

Figure 2 is a perspective view of the clutch connection between the stem of the plunger and the operating rod.

Figure 3 is a view looking right angularly to that shown in Figure 1, parts being broken away and the shaping nozzle being removed.

Figure 4 is a side elevation, with parts in section, the plunger being shown in its lower position in the barrel.

Figure 5 is a fragmentary elevation showing the arrangement of the parts when the plunger is moved out of the barrel.

Figure 6 is a sectional view approximately on the line 6—6 of Figure 1.

Figure 7 is a sectional view through the lower end of the barrel, showing the manner in which one form of shaping nozzle is attached thereto.

Figures 8 to 22 illustrate various forms of shaping nozzles employed.

Figure 13:
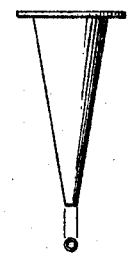
Figure 14:

As disclosed by the drawings, our improvement is pistol-like in general appearance, the same comprising a cylindrical barrel 1, and a butt or handle 2 which is formed angularly adjacent one end of the barrel. Pivotally secured, as at 3, to one side of the barrel 1 there is the operating lever 4. The operating lever, at the end thereof, opposite the handle 2, is formed with a ring 5, the said ring designed to receive therethrough the forefinger of the operator, the remaining fingers except the thumb gripping the handle 2. The thumb rests on a lug 6 formed on the handle, and the handle is preferably provided with a lug or extension 7 that provides a guard for the fingers that grip the handle, and a stop for the swinging movement of the operating lever in one direction.

Pivotally connected, as at 8, to the end of the trigger lever opposite that provided with the ring 5, there is a rod 9. The rod passes through a guide notch in a lug 10 that is formed adjacent one end of the barrel 1.

In the barrel there is a plunger 11. The plunger is provided with a stem 12 that passes through one end of the barrel. On the outer portion of the stem there is arranged a split sleeve member 13 having extending arms. Between the arms of the sleeve 13 there is pivoted, as at 14, a plate in the nature of a clutch lever 15. The clutch lever 15 has on its upper edge an outstanding ledge 16 provided with a somewhat elongated slot 17. The pointed corners of the clutch lever are designed to be moved into or out of gripping engagement with the stem 12 in a manner which will presently be apparent.

Pivotally secured, as at 18, adjacent to the outer end of the clutch lever 15 is the rod 9, and loosely journaled on the said pivot 18 there is an arm 19 that passes through the slot 17 in the ledge 16. The outer end of the arm 19 is bent upon itself or otherwise formed with a hook for the reception of one end of a comparatively light helical spring 20, the opposite end of the said spring 20 being connected to the pivot 8. The spring 20 normally is in the position illustrated in Figure 1 of the drawings, the same holding the swinging arm 19 at an outward angle with respect to the barrel, and causing the said arm to contact with one of the end walls provided by the slot 17. When in this position the lower pointed corner *a* of the clutch lever 15 is swung to gripping engagement with the stem 12 of the plunger 11 so that the plunger will be moved downwardly upon the operation of the trigger and the rod 9. When a pressure is exerted against the arm 19 to swing the same to the position illustrated in Figure 5, the arm 19 will contact with the second end wall provided by the slot 17 in the ledge 16, causing the spring 20 to cant the clutch lever and to bring the same out of engagement with the stem 12 to permit of the removal of the plunger 11 from the barrel. The swinging of the arm to such position will bring the second gripping corner *b* of the lever 15 to engage with the stem 12 of the plunger. The operating lever is operated in the same manner as when the plunger is forced into the barrel, it being noted that each pull and release of the operating lever swings the clutch lever 15 so that its biting corners *a* or *b* are momentarily brought out of gripping engagement with the stem 12.

Secured between the lug 10 and the pivot 8 there is a helical spring 21 which is designed to hold the operating lever 4 in inactive position.

The outlet end of the barrel or cylinder 1 is opposed to that through which the stem 12 passes, the said outlet end being preferably formed with an angle neck extension 22. Threadedly secured on the neck 22, is the ring enlargement 23 on one of any desired number of shaping nozzles 24.

Preferably different devices, as above described, are employed for forming the separate parts that constitute a flower or any other ornamental design to be made from sugar paste, but any of the several shaping nozzles 24 may be removably associated with the neck portions of the different devices.

Figure 15:
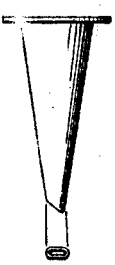
Figure 16:
Figure 17:
Figure 18:
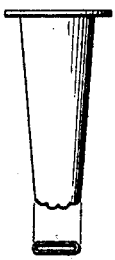
Figure 19:
Figure 20:
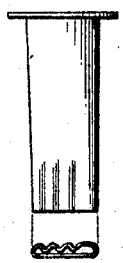
Figure 21:
Figure 22:
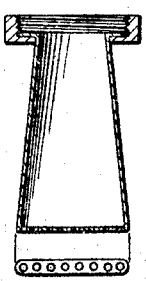

A number of shaping nozzles for producing the different parts of a flower or other sugar paste design are illustrated in detail in Figures 7 to 22 of the drawings, all of the said shaping nozzles being designated by the numeral 24. The shaping nozzle in Figure 7 is designed to produce leaves of roses or other flowers. Several of the shaping nozzles have their inner ends flanged for the reception of the cap nuts 23 that hold the same on the neck of the barrel 1. Others have the cap nuts integrally formed therewith. The plan views, associated with the several figures, disclose the different parts of flowers or other ornaments produced by the several shaping nozzles. The shavings of the sugar paste which are forced through the shaping nozzles by the plunger 11 will shape themselves to conform to the desired part of the flower or other design to be made, as for instance, the shaping nozzle in Figure 22 will produce blades of grass, etc., that in Figure 10 leaves, that in Figure 15, wide blades or leaves, that in Figures 17 and 20 moldings, while those in the remaining figures produce pistil, stamens, corollas and calyx of flowers.

When the plunger 11 is withdrawn in a manner as above described, the barrel 1 is filled with sugar paste. The paste may be applied in the barrel in any desired or preferred manner and is preferably loosely packed therein. The operating lever 4 is operated to again arrange the plunger in the barrel, and the arm 19 is swung to bring the corner *b* of the clutch lever 15 in biting engagement with the stem. A pull on the operating lever 4 will move the plunger downwardly in the barrel, as the same draws upon the rod 9 and moves the clutch lever 15 therewith. The arm 19 remains at the same angle as long as the clutch lever is in clutching engagement with the rod as will, it is thought, be apparent. The operating lever is swung a sufficient distance to eject the desired quantity or rather the desired length of the sugar paste through the shaping nozzles. Because of the various shapes of the mouths of the shaping nozzles, the ejected sugar paste will assume various shapes so that with a number of our devices, the parts or floral designs or other ornamentations may be easily and quickly made, and readily associated to produce either the flower or the ornament.

It is believed that the foregoing description, when taken in connection with the drawings will fully set forth the construction, operation and advantages of our improvement, but we desire it understood that we hold ourselves entitled to make such changes therefrom as fairly fall within the scope of what we claim.

Having described the invention, we claim:—

1. Devices for forming the separate parts of a flower or other ornamental candy designs, each comprising a barrel having an outlet nozzle and designed to receive therein a sugar paste, a plunger in the barrel having a stem extending therethrough, a spring influenced operating lever, a rod pivotally associated therewith, and clutch means associated with the rod and with the stem for locking the rod to the stem when the plunger is to be moved in the barrel.

2. Hand operated apparatus for making designs from sugar paste, including a barrel in which the sugar paste is arranged, said barrel having an extension angularly secured thereto and a shaping nozzle on said extension, a plunger in the barrel to rest on the sugar paste and having a stem projecting through the barrel, an operating lever pivotally secured to the barrel, a rod pivoted to the operating lever, spring means influencing the operating lever and rod in one direction, clutch means between the rod and stem, spring influenced means for holding the clutch means in engagement with the stem to permit of the movement of the latter to force the plunger against the sugar paste when the operating lever is swung and means for influencing the clutch means to a second position on the stem so that the swinging of the operating lever will withdraw the plunger from the barrel.

3. Apparatus for making parts of designs formed of sugar paste, including a barrel designed to receive sugar paste and having an angle extension secured thereto at the outlet end thereof, a shaping nozzle on said extension, a plunger in the barrel to rest on the sugar paste, a stem for the plunger projecting through the barrel, a split sleeve on the stem, a clutch lever pivoted to the sleeve and swingable to have one of its inner corners engage the stem, a handle on the barrel, an operating lever pivoted to the barrel, a rod loosely supported on the operating lever and pivoted to the clutch lever, an arm swingable on said pivot to engage the clutch lever to hold either of its corners in biting engagement with the stem, spring means influencing the operating lever to inactive position, and spring means for holding the arm in either of its mentioned positions.

4. Apparatus for manufacturing the parts of a pastry flower or other ornamental design, including a barrel to receive sugar paste and having a shaping nozzle at the outlet end thereof through which the paste is ejected in sheets and curled to provide the part of the ornament desired, a handle on the barrel, an operating lever having a ring end pivotally secured to the barrel, a notched lug on the barrel adjacent to the mouth thereof, a spring between the lug and operating lever, a plunger in the barrel to rest on the sugar paste and having a stem projecting through the mouth of the barrel, a split sleeve on the stem, a clutch lever pivoted to the arms of the split sleeve, a rod pivoted to the operating lever and to the clutch lever and guided in the notch of the lug, and said clutch lever having a slotted ledge, an arm loosely secured on the pivot for said rod and passing through the slot of said ledge, and spring means for sustaining the arm angularly with respect to the clutch lever and in engagement with either end wall provided by the slot in the ledge for holding the clutch lever in clutching engagement with the stem in either of two positions, for the purpose set forth.

In testimony whereof we affix our signatures.

ALBERTO MIGUEL BLACKALLER.
IGNACIO SEGOVIA.